United States Patent
Kaneko

(10) Patent No.: US 11,052,768 B2
(45) Date of Patent: Jul. 6, 2021

(54) ELECTRIC VEHICLE

(71) Applicant: TOYOTA JIDOSHA KABUSHIKI KAISHA, Aichi-ken (JP)

(72) Inventor: Tatsuya Kaneko, Nagoya (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 16/675,100

(22) Filed: Nov. 5, 2019

(65) Prior Publication Data

US 2020/0139822 A1    May 7, 2020

(30) Foreign Application Priority Data

Nov. 6, 2018  (JP) .............................. JP2018-209189

(51) Int. Cl.
| | |
|---|---|
| *B60L 15/20* | (2006.01) |
| *H02P 23/18* | (2016.01) |
| *H02P 23/20* | (2016.01) |
| *B60K 6/22* | (2007.10) |

(52) U.S. Cl.
CPC ............ *B60L 15/20* (2013.01); *H02P 23/183* (2016.02); *H02P 23/20* (2016.02); *B60K 6/22* (2013.01); *B60L 2240/24* (2013.01); *B60L 2240/423* (2013.01); *B60L 2250/28* (2013.01); *B60Y 2200/91* (2013.01); *B60Y 2200/92* (2013.01)

(58) Field of Classification Search
CPC ................. B60L 15/20; B60L 2240/24; B60L 2240/423; B60L 2250/28; H02P 23/183; H02P 23/20; B60Y 2200/91
See application file for complete search history.

(56) References Cited

U.S. PATENT DOCUMENTS

| | | | |
|---|---|---|---|
| 5,707,115 A * | 1/1998 | Bodie | B60L 15/2036 303/3 |
| 6,070,953 A | 6/2000 | Miyago | |
| 2005/0099146 A1* | 5/2005 | Nishikawa | B60K 6/52 318/63 |

FOREIGN PATENT DOCUMENTS

| | | |
|---|---|---|
| JP | H10-203351 A | 8/1998 |
| JP | 2008-301590 A | 12/2008 |
| JP | 2010-104086 A | 5/2010 |
| JP | 2012-60753 A | 3/2012 |

* cited by examiner

*Primary Examiner* — Cortez M Cook
(74) *Attorney, Agent, or Firm* — Hauptman Ham, LLP

(57) ABSTRACT

In an electric vehicle including a motor for traveling, when an accelerator is switched from an on-state to an off-state, the motor is controlled such that a vehicle torque is varied more gradually toward a requested torque on a brake side (requested torque in the off-state) in turning than in traveling straight. Thereby, when the accelerator is switched from the on-state to the off-state in turning, drivability of the driver can be restrained from deteriorating.

20 Claims, 6 Drawing Sheets

ELECTRIC VEHICLE

INCORPORATION BY REFERENCE

The disclosure of Japanese Patent Application No. 2018-209189 filed on Nov. 6, 2018 including the specification, drawings and abstract is incorporated herein by reference in its entirety.

BACKGROUND

1. Technical Field

The present disclosure relates to an electric vehicle, and in particular, relates to an electric vehicle including a motor for traveling.

2. Description of Related Art

There is conventionally proposed this type of electric vehicle including a motor for traveling and a brake actuator which causes hydraulic braking force to act on the vehicle (for example, see Japanese Patent Application Publication No. 10-203351). With such an electric vehicle, when a brake is operated, requested braking force is set based on brake stepping force, target regenerative braking force is set to be smaller when the vehicle is turning than when the vehicle is traveling straight to control the motor, and a difference between the requested braking force and the target regenerative braking force is set to target hydraulic braking force to control the brake actuator.

SUMMARY

On the electric vehicle as above, a larger acceleration in the transverse direction arises on the vehicle in turning than in traveling straight, and the posture of the vehicle tends to be unstable. Therefore, when a vehicle torque is evenly varied without considering whether the vehicle is traveling straight or turning when an accelerator is switched from an on-state to an off-state and the vehicle torque is varied toward a requested torque on the brake side with a torque of the motor and without operating the brake actuator, drivability (riding comfort) of the driver deteriorates more possibly in turning than in traveling straight.

A primary object of an electric vehicle of the present disclosure being devised is to restrain drivability of the driver from deteriorating when the accelerator is switched from the on-state to the off-state.

An electric vehicle of the present disclosure employs the following means in order to attain the aforementioned primary object.

An electric vehicle of an aspect of the present disclosure includes: a motor for traveling; and a control apparatus that controls the motor such that a vehicle torque is varied more gradually toward a requested torque on a brake side in turning than in traveling straight, when an accelerator is switched from an on-state to an off-state.

In this electric vehicle of the present disclosure, the motor may be controlled such that the vehicle torque is varied more gradually toward the requested torque on the brake side in turning than in traveling straight, when the accelerator is switched from the on-state to the off-state. Thereby, when the accelerator is switched from the on-state to the off-state in turning, drivability of the driver can be restrained from deteriorating.

In the electric vehicle of the present disclosure, the control apparatus may set a transient torque by performing rate processing using a rate value on the requested torque when the accelerator is switched from the on-state to the off-state, and control the motor such that the transient torque acts on the vehicle, and the control apparatus may set the rate value to be smaller in turning than in traveling straight, when the accelerator is switched from the on-state to the off-state. By doing so, the vehicle torque can be gradually varied toward the requested torque by varying the transient torque more gradually toward the requested torque on the brake side in turning than in traveling straight, when the accelerator is switched from the on-state to the off-state.

In the electric vehicle of the present disclosure, the control apparatus may set the rate value to be smaller when an absolute value of a steering angle or an acceleration in a transverse direction of the vehicle is large than when the absolute value of the steering angle or the acceleration in the transverse direction of the vehicle is small, when the accelerator is switched from the on-state to the off-state in turning. Although the posture of the vehicle tends to be more unstable as the absolute value of the steering angle or the acceleration in the transverse direction of the vehicle is larger, by setting the rate value as above, the transient torque (vehicle torque) can be varied more gradually toward the requested torque on the brake side when the absolute value of the steering angle or the acceleration in the transverse direction of the vehicle is large than when the absolute value of the steering angle or the acceleration in the transverse direction of the vehicle is small. As a result, when the accelerator is switched from the on-state to the off-state in turning, drivability of the driver can be more appropriately restrained from deteriorating.

In the electric vehicle of the present disclosure, the control apparatus may set the rate value to be smaller when the requested torque on a brake side is large than when the requested torque on a brake side is small or to be smaller when a requested deceleration of the vehicle based on the requested torque is large than when the requested deceleration of the vehicle based on the requested torque is small, when the accelerator is switched from the on-state to the off-state. By doing so, the transient torque (vehicle torque) can be varied toward the requested torque on the brake side more gradually when the requested torque on a brake side is large than when the requested torque on a brake side is small or more gradually when the requested deceleration of the vehicle is large than when the requested deceleration of the vehicle is small. As a result, when the requested torque on a brake side is large or the requested deceleration is large, shock given on the driver can be reduced.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Next, a mode for implementing the present disclosure will be described using embodiments.

Figure 1:
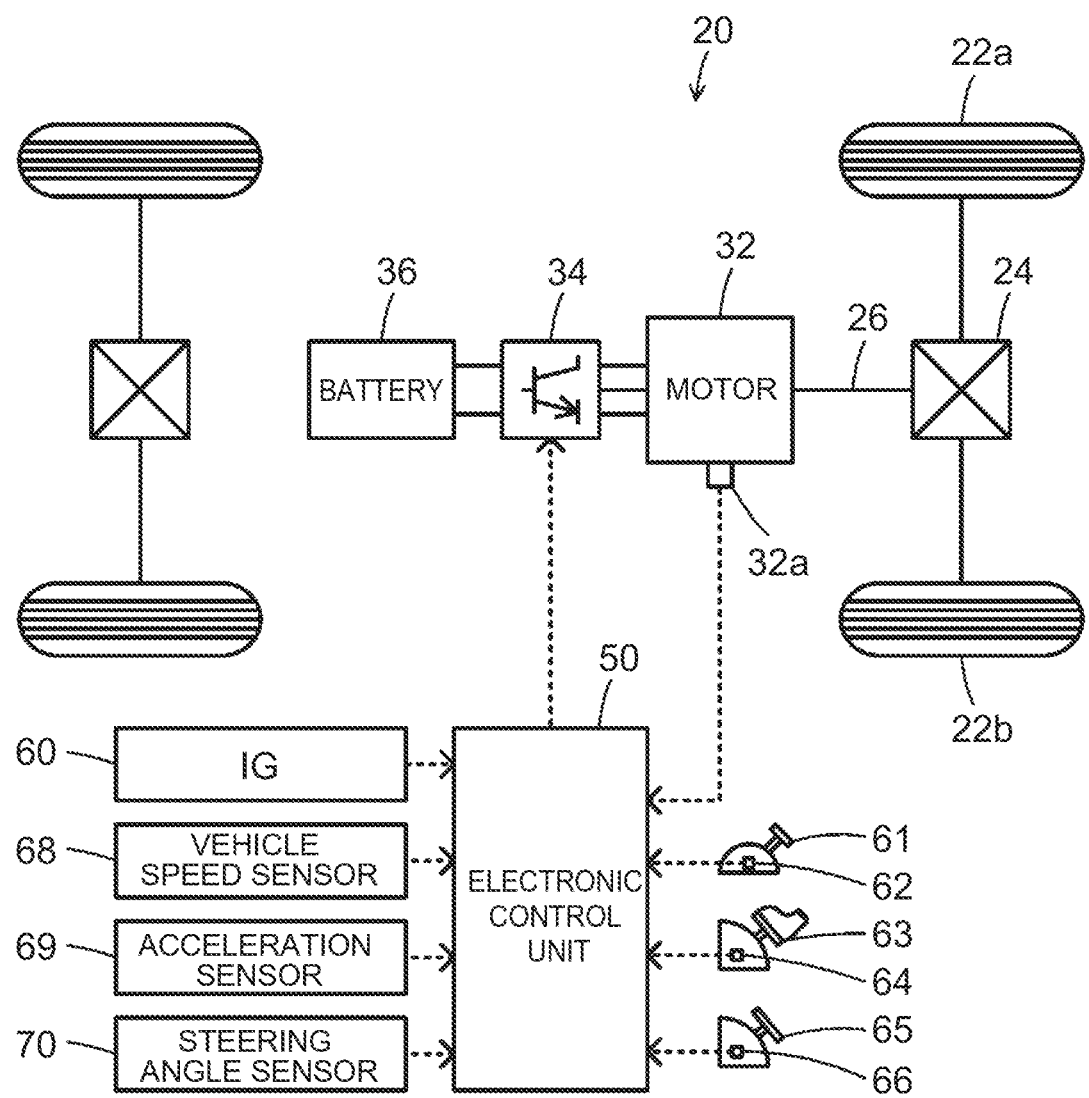
FIG. 1 is a configuration diagram schematically showing a configuration of an electric automobile 20 as an embodiment of the present disclosure.

FIG. 1 is a configuration diagram schematically showing a configuration of an electric automobile 20 as an embodiment of the present disclosure. As shown in the figure, the electric automobile 20 of the embodiment includes a motor 32, an inverter 34, a battery 36 as an electric power storage apparatus, and an electronic control unit 50.

The motor 32 is configured as a synchronous motor-generator, for example, and a rotor thereof is connected to a drive shaft 26 which is coupled to drive wheels 22a, 22b via differential gears 24. The inverter 34 is used for driving the motor 32, and is connected to the battery 36 via an electric power line. The motor 32 is rotationally driven by switching of a plurality of not-shown switching elements of the inverter 34 being controlled by the electronic control unit 50. The battery 36 is configured as a lithium ion secondary battery or a nickel-metal hydride secondary battery, for example.

Not shown so in the figure, the electronic control unit 50 is configured as a microprocessor having a CPU as a primary component and includes, in addition to the CPU, a ROM storing a processing program, a RAM temporarily storing data, and input-output ports. Signals from various sensors are input into the electronic control unit 50 via input ports. Examples of such signals input into the electronic control unit 50 include a rotational position θm of the rotor of the motor 32 from a rotational position sensor 32a which detects a rotational position of the rotor of the motor 32, and phase currents Iu, Iv, Iw of phases of the motor 32 from not-shown current sensors which detect phase currents of the phases of the motor 32. Moreover, such examples also include a voltage Vb of the battery 36 from a not-shown voltage sensor attached between terminals of the battery 36, and a current Ib of the battery 36 from a not-shown current sensor attached onto an output terminal of the battery 36. Furthermore, the examples also include an ignition signal from an ignition switch 60, and a shift position SP from a shift position sensor 62 which detects an operation position of a shift lever 61. The examples also include an accelerator pedal operation amount Acc from an accelerator pedal position sensor 64 which detects a pressing amount of an accelerator pedal 63, a brake pedal position BP from a brake pedal position sensor 66 which detects a pressing amount of a brake pedal 65, and a vehicle speed V from a vehicle speed sensor 68. The examples also include a front-rear acceleration Gx and a transverse acceleration Gy from an acceleration sensor 69 which detects accelerations in the vehicle front-rear direction and the vehicle transverse direction, and a steering angle θs from a steering angle sensor 70. Switching control signals to the plurality of switching elements of the inverter 34, and the like are output from the electronic control unit 50 via output ports. The electronic control unit 50 calculates a power storage rate SOC of the battery 36 based on an integrated value of the current Ib of the battery 36 from the current sensor.

Figure 2:
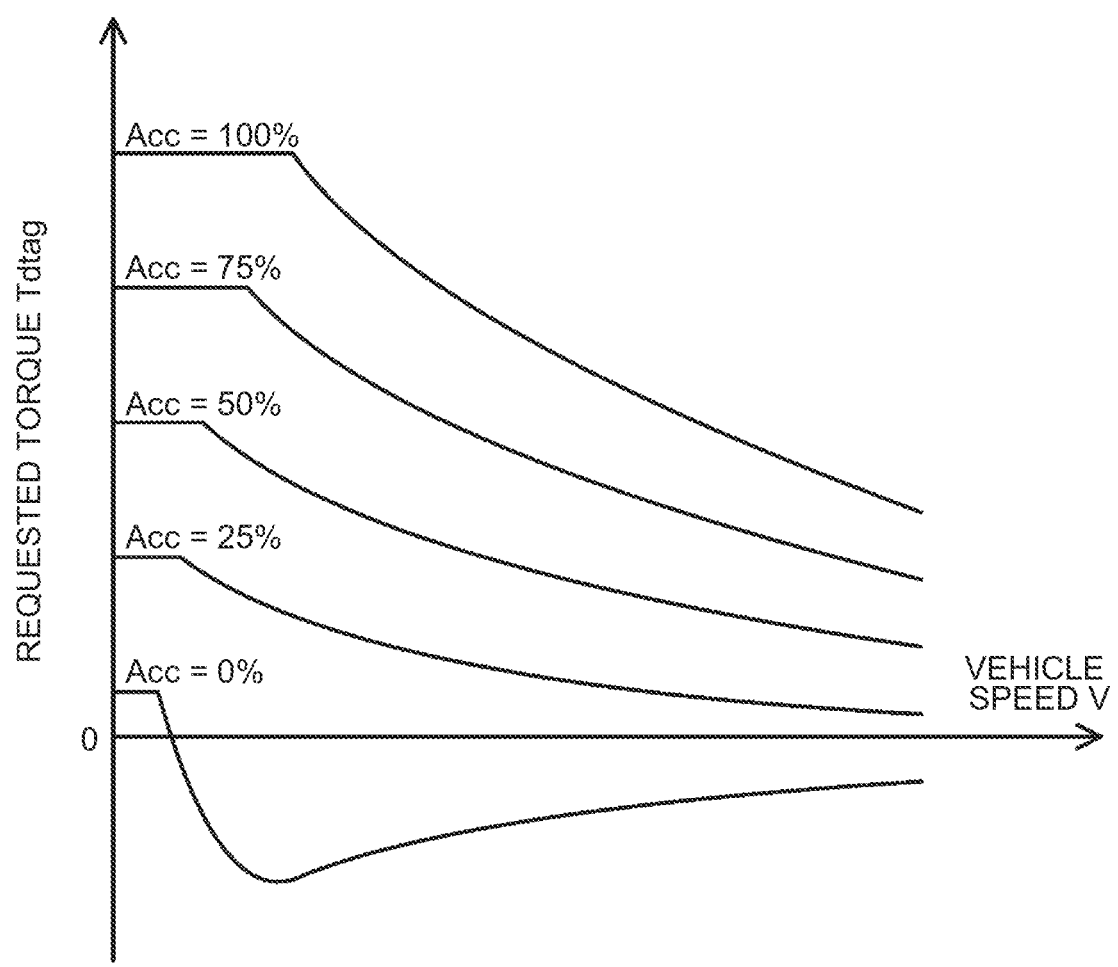
FIG. 2 is an explanatory diagram exemplarily showing a map for requested torque setting.

In the electric automobile 20 of the embodiment configured as above, basically, the electronic control unit 50 sets a requested torque Tdtag required for traveling (required for the drive shaft 26) based on the accelerator pedal operation amount Acc and the vehicle speed V, sets a torque instruction Tm* of the motor 32 such that the set requested torque Tdtag is output to the drive shaft 26, and performs switching control of the plurality of switching elements of the inverter 34 such that the motor 32 is driven under the set torque instruction Tm*. It is supposed here in the embodiment that relation between the accelerator pedal operation amount Acc, the vehicle speed V and the requested torque Tdtag is predefined and stored as a map for requested torque setting in a not-shown ROM, and when the accelerator pedal operation amount Acc and the vehicle speed V are given, the requested torque Tdtag is set by deriving the corresponding requested torque Tdtag from this map. FIG. 2 is an explanatory diagram exemplarily showing the map for requested torque setting.

Moreover, when an accelerator is switched from an on-state to an off-state, the electronic control unit 50 sets a transient torque Tdtra by performing rate processing using a rate value Rt on a requested torque Tdtag in the off-state (requested torque on the brake side), sets the torque instruction Tm* of the motor 32 such that the transient torque Tdtra is output to the drive shaft 26, and performs switching control of the plurality of switching elements of the inverter 34 such that the motor 32 is driven under the set torque instruction Tm*. As above, the transient torque Tdtra (vehicle torque) is gradually varied toward the requested torque Tdtag in the off-state. Notably, as expressed in equation (1), there is set, as the transient torque Tdtra, a value obtained by cutting off a value having the rate value Rt subtracted from a previous transient torque (previous Tdtra) with the requested torque Tdtag in the off-state being as a lower limit. Herein, to the previous transient torque (previous Tdtra) immediately after the accelerator is switched from the on-state to the off-state, the requested torque Tdtag immediately before the accelerator is switched from the on-state to the off-state (in the on-state) is set.

$$Tdtra=\max(\text{previous } Tdtra-Rt, Tdtag) \quad (1)$$

Figure 3:
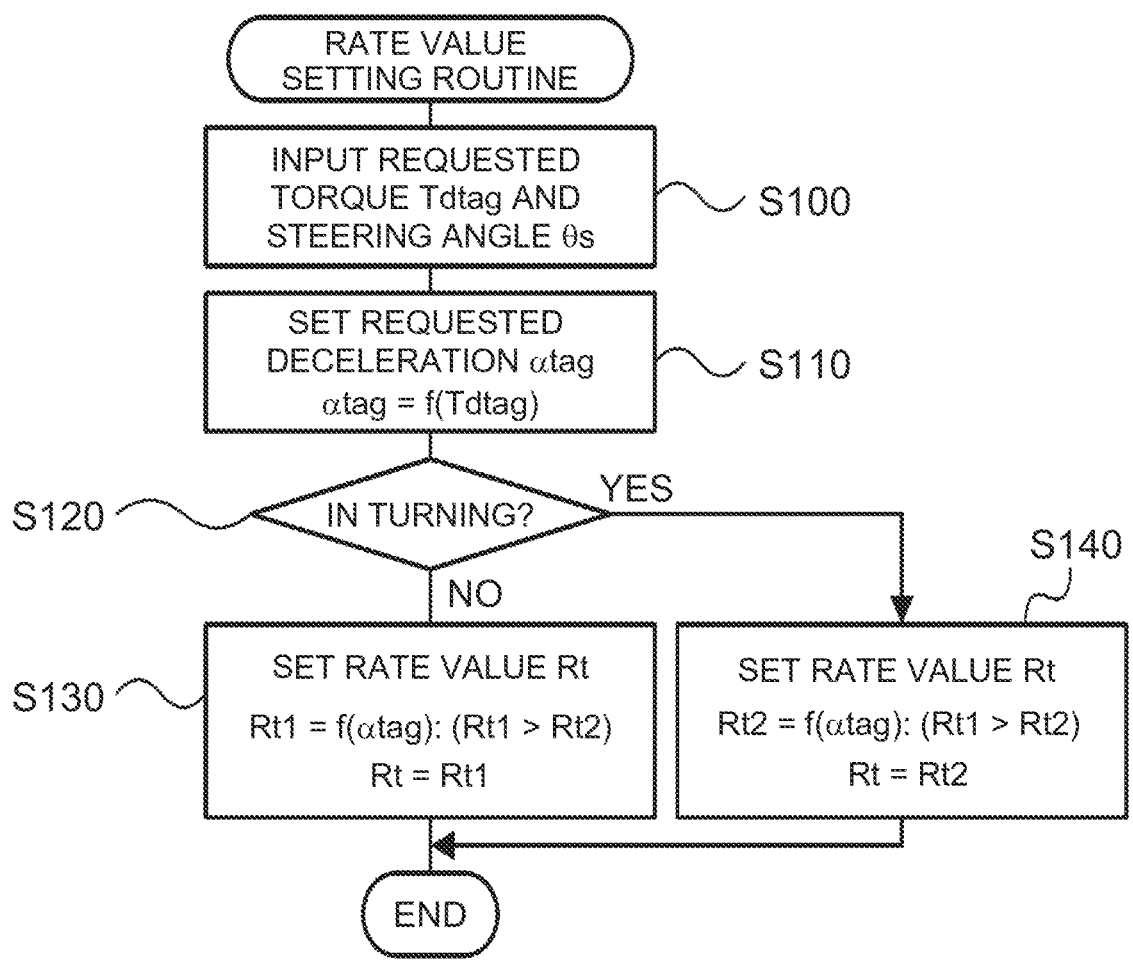
FIG. 3 is a flowchart exemplarily showing a rate value setting routine performed by an electronic control unit 50.

Next, operation of the electric automobile 20 of the embodiment configured as above, in particular, operation thereof in setting the aforementioned rate value Rt is described. FIG. 3 is a flowchart exemplarily showing a rate value setting routine performed by the electronic control unit 50. This routine is performed when the accelerator is switched from the on-state to the off-state.

When the rate value setting routine in FIG. 3 starts to be performed, the requested torque Tdtag in the off-state (requested torque on the brake side) and the steering angle θs from the steering angle sensor 70 are input into the electronic control unit 50 (step S100), and the electronic control unit 50 sets a requested deceleration αtag of the vehicle based on the input requested torque Tdtag (step S110). It is supposed here in the embodiment that the requested deceleration αtag is set to be larger (to be a more rapid deceleration) as the requested torque Tdtag on the brake side is larger. For example, the requested deceleration αtag can be calculated by multiplying the requested torque Tdtag by a conversion factor to convert the "torque" into "force" and dividing the result by a vehicle weight.

Subsequently, it is determined whether or not the vehicle is turning by comparing the absolute value of the steering angle θs to a threshold θsref (step S120). Then, when the vehicle is not turning (when the vehicle is traveling straight), a relatively large value Rt1 is set to the rate value Rt (step S130) to end this routine. On the other hand, when the vehicle is turning, a smaller value Rt2 than the value Rt1 is set to the rate value Rt (step S140) to end this routine.

Figure 4:
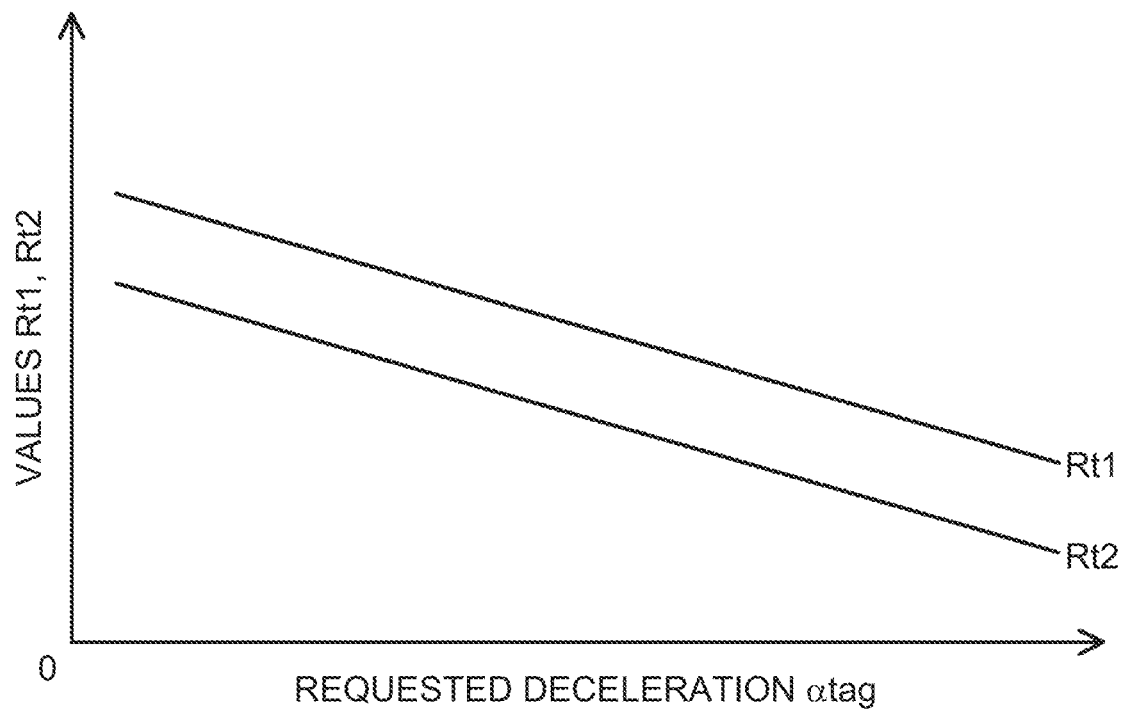
FIG. 4 is an explanatory diagram exemplarily showing relation between a requested deceleration αtag and values Rt1, Rt2.

It is supposed here in the embodiment that relation between the requested deceleration αtag and the values Rt1, Rt2 is predefined and stored as a map in a not-shown ROM, and when the requested deceleration αtag is given, the values Rt1, Rt2 are set by deriving the corresponding values Rt1, Rt2 from this map. FIG. 4 is an explanatory diagram exemplarily showing the relation between the requested deceleration αtag and the values Rt1, Rt2. As shown in the figure, the values Rt1, Rt2 are set to be smaller as the requested deceleration αtag is larger. The reason is mentioned later.

Figure 5:
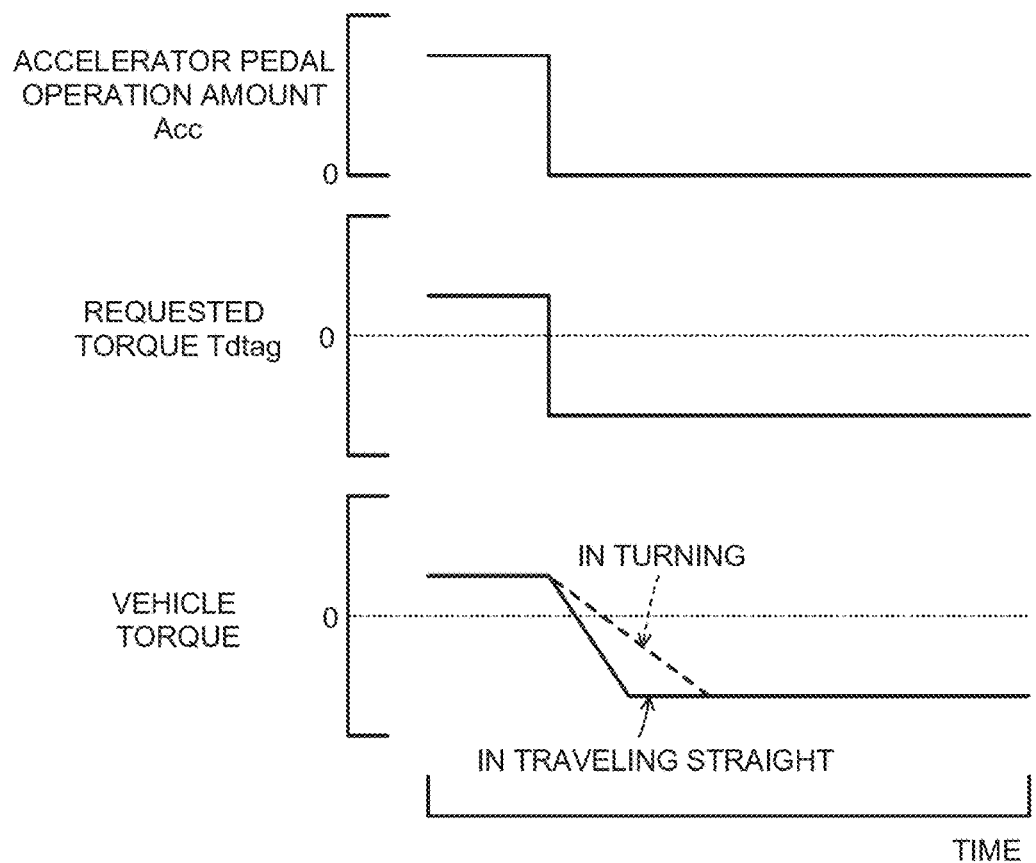
FIG. 5 is an explanatory diagram exemplarily showing situations of a requested torque Tdtag and a vehicle torque in the occasion when an accelerator is switched from an on-state to an off-state.

FIG. 5 is an explanatory diagram exemplarily showing situations of the requested torque Tdtag and the vehicle torque in the occasion when the accelerator is switched from the on-state to the off-state. In the figure, a solid line indicates a situation in the occasion when the accelerator is switched from the on-state to the off-state in traveling straight, and a broken line indicates a situation in the occasion when the accelerator is switched from the on-state to the off-state in turning. As mentioned above, since the smaller rate value Rt is used in turning than in traveling straight, as shown in the figure, the transient torque Tdtra (vehicle torque) is varied more gradually toward the requested torque Tdtag on the brake side when the accelerator is switched from the on-state to the off-state in turning than when the accelerator is switched from the on-state to the off-state in traveling straight.

In the electric automobile 20, a larger transverse acceleration Gy arises on the vehicle in turning than in traveling straight, and the posture of the vehicle tends to be unstable. Therefore, when the transient torque Tdtra (vehicle torque) is rapidly varied toward requested torque Tdtag on the brake side by performing, on the requested torque Tdtag, rate processing using the predetermined relatively large value Rt1 as the rate value Rt without considering whether the vehicle is traveling straight or turning when the accelerator is switched from the on-state to the off-state to set the transient torque Tdtra, drivability (riding comfort) of the driver deteriorates more possibly in turning than in traveling straight. On the contrary, in the embodiment, the transient torque Tdtra (vehicle torque) is gradually varied toward the requested torque Tdtag on the brake side by performing, on the requested torque Tdtag, rate processing using the smaller rate value Rt when the accelerator is switched from the on-state to the off-state in turning than when the accelerator is switched from the on-state to the off-state in traveling straight to set the transient torque Tdtra. Thereby, when the accelerator is switched from the on-state to the off-state in turning, drivability of the driver can be restrained from deteriorating.

Moreover, in the embodiment, the transient torque Tdtra (vehicle torque) is varied more gradually toward the requested torque Tdtag on the brake side as the requested deceleration Wag is larger by setting the rate value Rt to be smaller as the requested deceleration Wag is larger both in traveling straight and in turning. Thereby, when the requested deceleration Wag is large, shock given on the driver can be reduced.

In the electric automobile 20 of the embodiment described above, the transient torque Tdtra is set by performing, on the requested torque Tdtag, rate processing using the smaller rate value Rt when the accelerator is switched from the on-state to the off-state in turning than when the accelerator is switched from the on-state to the off-state in traveling straight to control the motor 32. Thereby, the transient torque Tdtra (vehicle torque) can be varied more gradually toward the requested torque Tdtag on the brake side when the accelerator is switched from the on-state to the off-state in turning than when the accelerator is switched from the on-state to the off-state in traveling straight. As a result, when the accelerator is switched from the on-state to the off-state in turning, drivability of the driver can be restrained from deteriorating.

While in the electric automobile 20 of the embodiment, determining whether or not the vehicle is turning is performed when the accelerator is switched from the on-state to the off-state by comparing the absolute value of the steering angle θs from the steering angle sensor 70 to the threshold θsref, it may be performed by comparing the absolute value of the transverse acceleration Gy from the acceleration sensor 69 to a threshold Gyref.

Figure 6:
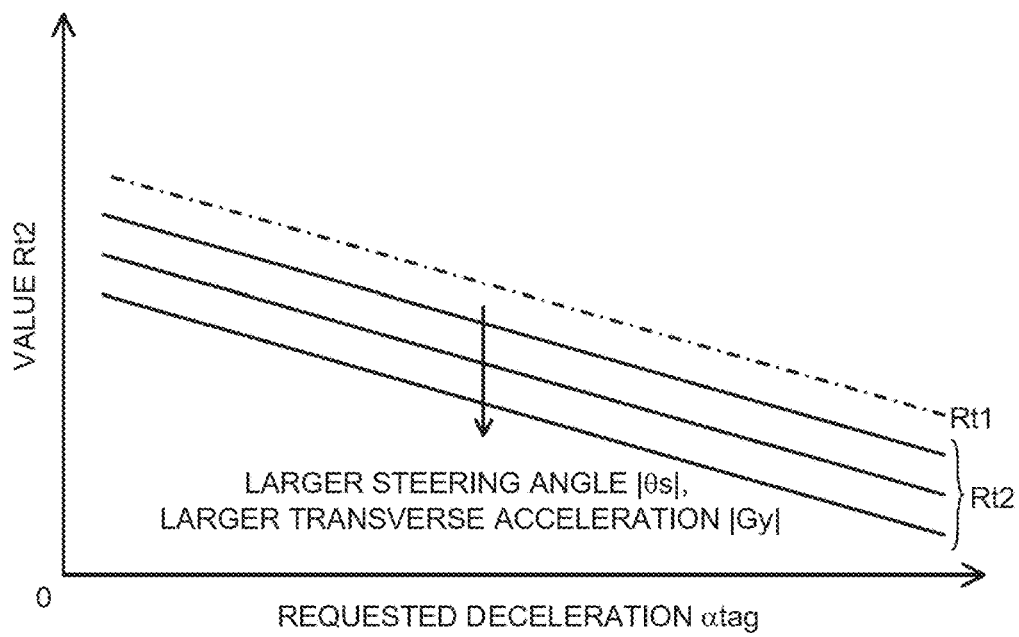
FIG. 6 is an explanatory diagram exemplarily showing relation between the requested deceleration αtag and the value Rt2.

While in the electric automobile 20 of the embodiment, the value Rt2 used for setting the rate value Rt is set not using the steering angle θs or the transverse acceleration Gy when the accelerator is switched from the on-state to the off-state in turning, it may be set using the steering angle θs or the transverse acceleration Gy. FIG. 6 is an explanatory diagram exemplarily showing relation between the requested deceleration Wag and the value Rt2 in this case. Notably, FIG. 6 also shows the value Rt1 with a long dashed short dashed line for reference. As shown in the figure, the value Rt2 is set to be smaller as the absolute value of the steering angle θs or the absolute value of the transverse acceleration Gy is larger. The posture of the vehicle tends to be more unstable as the absolute value of the steering angle θs or the absolute value of the transverse acceleration Gy is larger. Accordingly, by setting the rate value Rt as above, when the accelerator is switched from the on-state to the off-state in turning, drivability of the driver can be more appropriately restrained from deteriorating.

In the electric automobile 20 of the embodiment, when the accelerator is switched from the on-state to the off-state, the values Rt1, Rt2 used for setting the rate value Rt are set to be smaller as the requested deceleration αtag is larger. Nevertheless, since the requested deceleration Wag is set to be larger (to be a more rapid deceleration) as the requested torque Tdtag on the brake side is larger, the values Rt1, Rt2 may be set to be smaller as the requested torque Tdtag is smaller (larger on the brake side) no using the requested deceleration αtag.

While in the electric automobile 20 of the embodiment, the transient torque Tdtra is set by performing rate processing using the rate value Rt on the requested torque Tdtag when the accelerator is switched from the on-state to the off-state, the transient torque Tdtra may be set by performing smoothing processing using a time constant τt on the requested torque Tdtag. In this case, the transient torque Tdtra (vehicle torque) may be gradually varied toward the requested torque Tdtag on the brake side by setting a larger time constant τt when the accelerator is switched from the on-state to the off-state in turning than when the accelerator is switched from the on-state to the off-state in traveling straight.

While in the electric automobile 20 of the embodiment, the battery 36 is used as an electric power storage apparatus, a capacitor may be used instead.

Figure 7:
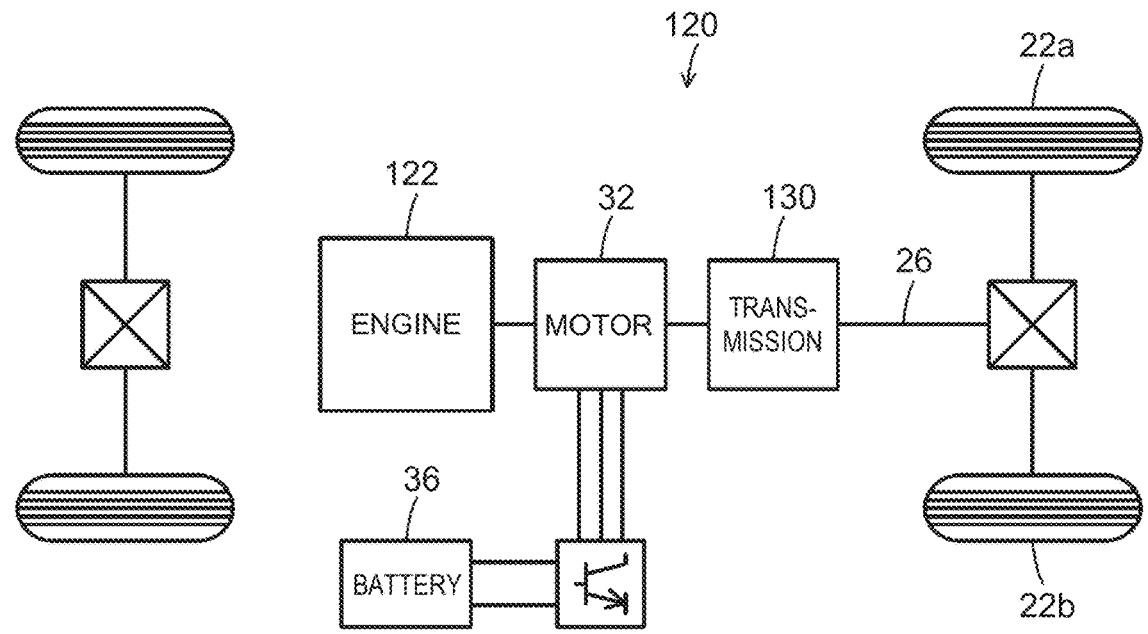
FIG. 7 is a configuration diagram schematically showing a configuration of a hybrid automobile 120.
Figure 8:
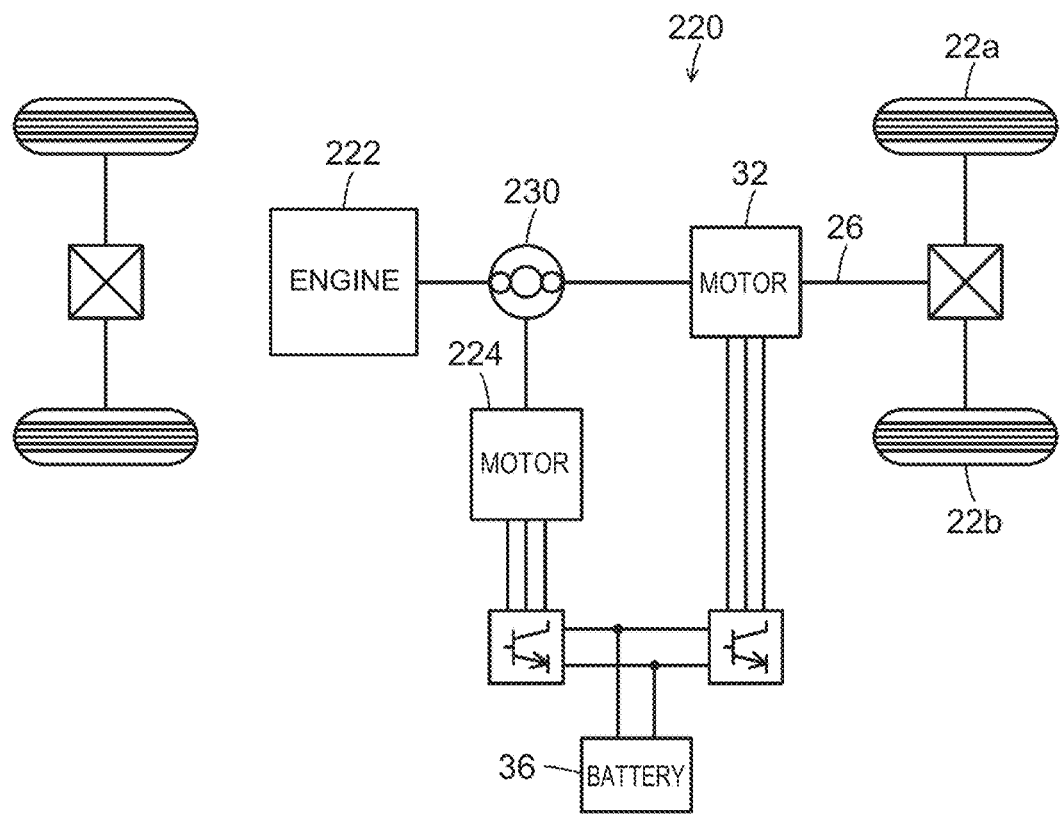
FIG. 8 is a configuration diagram schematically showing a configuration of a hybrid automobile 220.

In the embodiment, a configuration of the electric automobile 20 is employed in which the motor 32 is connected to the drive shaft 26 which is coupled to the drive wheels 22a, 22b, and the battery 36 is electrically connected to the motor 32. Nevertheless, as shown in FIG. 7, a configuration of a hybrid automobile 120 may be employed in which the motor 32 is connected, via a transmission 130, to the drive shaft 26 which is coupled to the drive wheels 22a, 22b, an engine 122 is connected to the motor 32, and the battery 36 is electrically connected to the motor 32. Moreover, as shown in FIG. 8, a configuration of a hybrid automobile 220 may be employed in which the motor 32 is connected to the drive shaft 26 which is coupled to the drive wheels 22a, 22b, an engine 222 and a motor 224 are connected, via planetary gears 230, to the drive shaft 26, and the battery 36 is electrically connected to the motors 32, 224.

Correspondences between main elements in the embodiment and main elements of the present disclosure disclosed in the section "SUMMARY" are described. In the embodiment, the motor 32 corresponds to the "motor", and the electronic control unit 50 corresponds to the "control apparatus".

Notably, since the correspondences between the main elements in the embodiment and the main elements of the present disclosure disclosed in the section "SUMMARY" are exemplary for describing a mode for implementing the present disclosure disclosed in the section "SUMMARY" for the embodiment solving a problem, elements of the present disclosure disclosed in the section "SUMMARY" are not limited. Namely, the present disclosure disclosed in the section "SUMMARY" should be construed based on the description in the section, and the embodiment is merely a specific example of the present disclosure disclosed in the section "SUMMARY".

As above, a mode for implementing the present disclosure has been described using the embodiment, and an applicable embodiment of the present disclosure is not limited to such an embodiment at all but can be embodied in various modes without departing from the spirit of the present disclosure.

The present disclosure can be used for industries for manufacturing electric vehicles, and the like.

What is claimed is:

1. An electric vehicle comprising:
a motor for traveling; and
a control apparatus that controls the motor such that a vehicle torque is varied more gradually toward a requested torque on a brake side in turning than in traveling straight, when an accelerator is switched from an on-state to an off-state.

2. The electric vehicle according to claim 1, wherein:
the control apparatus sets a transient torque by performing rate processing using a rate value on the requested torque when the accelerator is switched from the on-state to the off-state, and controls the motor such that the transient torque acts on the vehicle; and
the control apparatus sets the rate value to be smaller in turning than in traveling straight, when the accelerator is switched from the on-state to the off-state.

3. The electric vehicle according to claim 2, wherein the control apparatus sets the rate value to be smaller when an absolute value of a steering angle or an acceleration in a transverse direction of the vehicle is large than when the absolute value of the steering angle or the acceleration in the transverse direction of the vehicle is small, when the accelerator is switched from the on-state to the off-state in turning.

4. The electric vehicle according to claim 2, wherein the control apparatus sets the rate value to be smaller when the requested torque on a brake side is large than when the requested torque on a brake side is small or to be smaller when a requested deceleration of the vehicle based on the requested torque is large than when the requested deceleration of the vehicle based on the requested torque is small, when the accelerator is switched from the on-state to the off-state.

5. The electric vehicle according to claim 1, wherein a vehicle torque rate when the vehicle is turning varies in a substantially linear fashion.

6. The electric vehicle according to claim 1, wherein a vehicle torque rate when the vehicle is traveling straight varies in a substantially linear fashion.

7. The electric vehicle according to claim 1, wherein the control apparatus is connected to an accelerator pedal.

8. An electric vehicle comprising:
a motor for traveling;
a control apparatus configured to control the motor such that a vehicle torque is varied more gradually toward a requested torque on a brake side in turning than in traveling straight, when an accelerator is switched from an on-state to an off-state, wherein:
the control apparatus is configured to set a transient torque by performing rate processing using a rate value on the requested torque when the accelerator is switched from the on-state to the off-state, and controls the motor such that the transient torque acts on the vehicle; and
the control apparatus is configured to set the rate value to be smaller in turning than in traveling straight, when the accelerator is switched from the on-state to the off-state.

9. The electric vehicle according to claim 8, wherein the control apparatus is configured to set the rate value to be smaller when an absolute value of a steering angle or an acceleration in a transverse direction of the vehicle is large than when the absolute value of the steering angle or the acceleration in the transverse direction of the vehicle is small, when the accelerator is switched from the on-state to the off-state in turning.

10. The electric vehicle according to claim 8, wherein the control apparatus is configured to set the rate value to be smaller when the requested torque on a brake side is large than when the requested torque on a brake side is small.

11. The electric vehicle according to claim 8, wherein the control apparatus is configured to set the rate value to be smaller when a requested deceleration of the vehicle based on the requested torque is large than when the requested deceleration of the vehicle based on the requested torque is small, when the accelerator is switched from the on-state to the off-state.

12. The electric vehicle according to claim 8, wherein a vehicle torque rate when the vehicle is turning varies in a substantially linear fashion.

13. The electric vehicle according to claim 8, wherein a vehicle torque rate when the vehicle is traveling straight varies in a substantially linear fashion.

14. The electric vehicle according to claim 8, wherein the control apparatus is connected to an accelerator pedal.

15. An hybrid vehicle comprising:
a motor for traveling;
a control apparatus configured to control the motor such that a vehicle torque is varied more gradually toward a requested torque on a brake side in turning than in traveling straight, when an accelerator is switched from an on-state to an off-state, wherein:
the control apparatus is configured to set a transient torque by performing rate processing using a rate value on the requested torque when the accelerator is switched from the on-state to the off-state, and controls the motor such that the transient torque acts on the vehicle; and
the control apparatus is configured to set the rate value to be smaller in turning than in traveling straight, when the accelerator is switched from the on-state to the off-state.

16. The hybrid vehicle according to claim 15, wherein the control apparatus is configured to set the rate value to be smaller when an absolute value of a steering angle or an acceleration in a transverse direction of the vehicle is large than when the absolute value of the steering angle or the acceleration in the transverse direction of the vehicle is small, when the accelerator is switched from the on-state to the off-state in turning.

17. The hybrid vehicle according to claim 15, wherein the control apparatus is configured to set the rate value to be smaller when the requested torque on a brake side is large than when the requested torque on a brake side is small.

18. The hybrid vehicle according to claim 15, wherein the control apparatus is configured to set the rate value to be smaller when a requested deceleration of the vehicle based on the requested torque is large than when the requested deceleration of the vehicle based on the requested torque is small, when the accelerator is switched from the on-state to the off-state.

19. The hybrid vehicle according to claim 15, wherein a vehicle torque rate when the vehicle is turning varies in a substantially linear fashion.

20. The hybrid vehicle according to claim 15, wherein a vehicle torque rate when the vehicle is traveling straight varies in a substantially linear fashion.

* * * * *